April 15, 1930.  E. S. EVANS  1,754,821
AUTOMOBILE TIE-DOWN
Filed Oct. 9, 1924  2 Sheets-Sheet 1

Inventor
Edward S. Evans
By
Bryant
Attorney

April 15, 1930.  E. S. EVANS  1,754,821
AUTOMOBILE TIE-DOWN
Filed Oct. 9, 1924   2 Sheets-Sheet 2

Inventor
Edward S. Evans
By
Attorney

Patented Apr. 15, 1930

1,754,821

UNITED STATES PATENT OFFICE

EDWARD S. EVANS, OF DETROIT, MICHIGAN, ASSIGNOR TO THE EVANS AUTO LOADING CO. INC., OF DETROIT, MICHIGAN, A CORPORATION OF DELAWARE

AUTOMOBILE TIE DOWN

Application filed October 9, 1924. Serial No. 742,592.

In the shipment of automobiles in railway cars, it is customary to anchor the automobile upon the floor of the car in a manner to prevent shifting movements thereof and in a substantially rigid condition. It is therefore the primary object of this invention to anchor or tie down the automobile by the employment of a device in the form of a strap that is preferably associated with one of the spokes of the automobile wheel and in turn anchored to the car floor.

The invention more specifically refers to the anchoring feet of the tie down in which the tie down being formed of a metallic strap has the ends or foot portions associated with a foot plate for reinforcing the foot portions of the tie down strap and affording increased anchorage for the tie down.

Another object of the invetnion is to provide the foot portion of the tie down strap with a return bend formation having a foot plate anchored between the foot and return bent portion thereof with the foot plate being of an area to extend laterally of the tie down foot for anchoring to a support.

A still further object of the invention is to provide a foot plate for each foot of a metallic tie down strap wherein the foot portion of the tie down strap is passed through spaced openings in a foot plate with portions of the tie down foot disposed above and below the foot plate to provide increased strength and anchorage in securing the tie down to a support.

With the above general objects in view and others that will appear as the nature of the invention is better understood, the same consists of the novel form, combination and arrangement of parts hereinafter more fully described, shown in the accompanying drawings and claimed.

Figure 1:
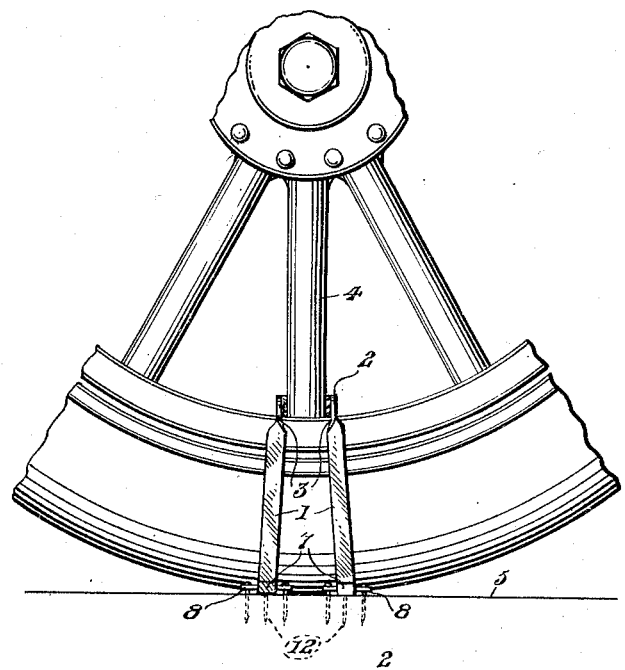
Figure 2:
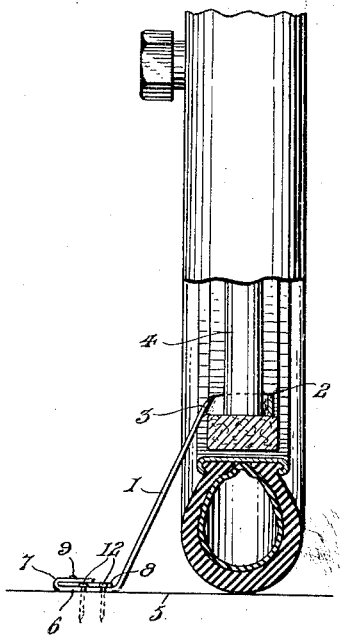
Figure 3:
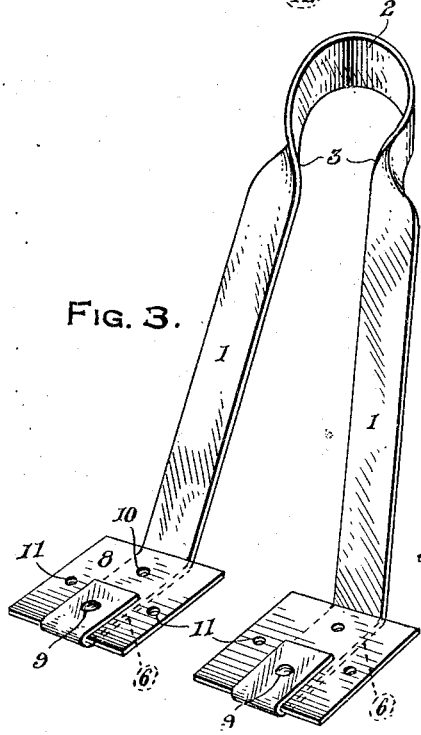
Figure 4:
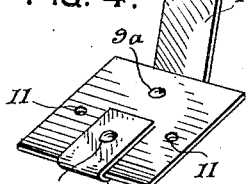
Figure 5:
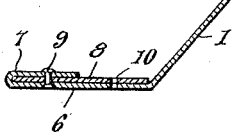
Figure 6:
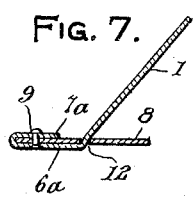
Figure 7:
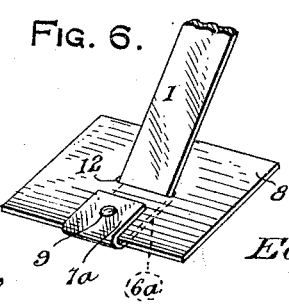
Figure 8:
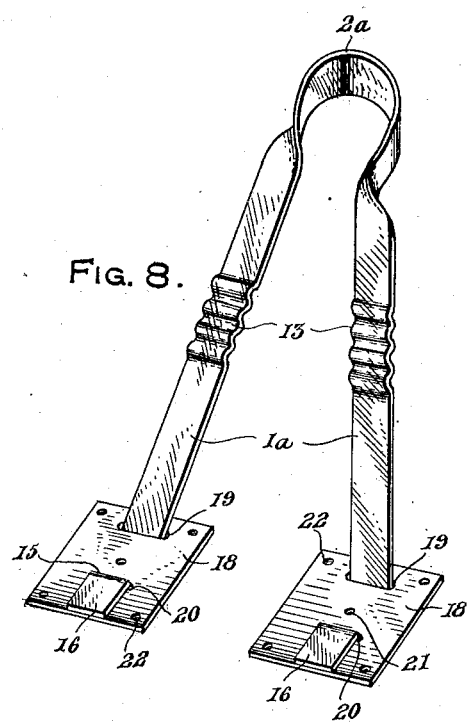

In the drawings, wherein like reference characters designate corresponding parts throughout the several views, Figure 1 is a fragmentary side elevational view of an automobile wheel anchored to a support by the tie down, Figure 2 is an edge elevational view of the wheel, partly in section showing the collar portion of the tie down enclosing a wheel spoke adjacent the wheel felly and anchored to a support, Figure 3 is a perspective view of the tie down detached from the wheel and support showing the foot plate interposed between the lower portion of the tie down foot and the upper return bent portion thereof with the foot and foot plate secured together by a rivet or the like, Figure 4 is a fragmentary perspective view showing the tie down foot, similar to Fig. 3 with a pair of rivets or like devices for securing the foot plates to the tie down foot, Figure 5 is a detail sectional view of the foot illustrated in Fig. 3, Figure 6 is a fragmentary perspective view of a modified form of foot showing the leg or strap portion of the tie down passed through a slotted opening in the foot plate with the end of the foot return bent to overlie the foot plate and secured thereto by a rivet, Figure 7 is a detail sectional view of the foot shown in Fig. 6, Figure 8 is a perspective view of another form of tie down and foot wherein the legs of the tie down are corrugated to add resiliency or elasticity thereto and wherein the foot plate is formed as shown in Fig. 6.

In the preferred form of the invention as illustrated in Figs. 1 to 5, the tie down is formed of a metallic strap of a width that is constant throughout its length and is bent into substantially U-formation to provide side legs 1 and an intermediate collar 2, the side legs being twisted at the point 3 as illustrated in Fig. 3 to dispose the collar at an angle to the longitudinal axis of the legs 1 for enclosing a wheel spoke 4.

As shown in Fig. 2, the legs 1 of the tie down extend at an angle outwardly of the wheel and have the lower ends or foot portions thereof anchored to the car floor 5 or other support. The preferred form of foot and foot plate associated therewith is shown in Figs. 3 and 5, the lower end of each side leg 1 being angularly bent to provide a flat foot 6 that is upwardly and rearwardly return bent as at 7 to overlie the foot portion 6. The foot plate 8, of any configuration desired, but preferably of a rectangular form as illustrated in Fig. 3 is supported upon the foot portion 6 with the return bent portion 7 of the foot overlying the foot plate while the latter preferably extends over the entire length of the foot portion as illustrated in Fig. 5. To provide for a permanent connection between the tie down foot and foot plate, alined openings are formed in the foot portion 6, the return bent portion 7 and the foot plate 8 and through which a securing rivet 9 extends as shown in Fig. 3. Registering openings 10 are formed in the foot portion 6 and foot plate 8 inwardly of the return bent portion 7 while openings 11 are formed in the foot plate 8 at opposite sides of the foot portion 6 for the reception of suitable fastening devices 12 such as nails or the like for anchoring the tie down feet to the car floor or other support 5. It will, therefore, be seen that each foot 6 of the tie down is reinforced or strengthened by the associated foot plate 8 and a more secure fastening or anchorage for the tie down to the car floor or other support is made possible by the association of these elements.

A slightly modified form of securing the foot plate to the foot portion is shown in Fig. 4 wherein a rivet 9ª is embedded in the registering openings 10 of the foot portion and foot plate so that the lateral openings 11 in the foot plate alone receive the anchoring nails 12 or the like.

As shown in Figs. 6 and 7, the foot plate 8 is provided with a cross slot 12 arranged substantially centrally thereof and through which slot the lower end of the leg 1 is passed, the foot portion 6ª extending forwardly beneath the foot plate 8 with the forward end of the foot portion 6ª directed upwardly and then return bent as at 7ª to overlie the outer edge of the foot plate with the rivet 9 permanently connecting the foot portion 6ª, the return bent portion 7ª and foot plate 8. In this form of foot construction, the same may be anchored to the car floor 5 or other support in any suitable manner such as by nails or the like as described in connection with the preferred form of the invention.

In the form of the invention shown in Fig. 8, the tie down strap has side legs 1ª connected by the spoke engaging collar 2ª of substantially U-formation as illustrated in Fig. 3, the side legs 1ª of the tie down being corrugated intermediate the upper and lower ends thereof as at 13 to render the tie down substantially resilient or elastic in the lengthwise direction thereof for partially absorbing shocks and jars incident to the shipment of automobiles and to reduce to a minimum, any possible damage to the automobile during shipment thereof. The lower end of each side leg 1ª is bent to provide a foot and has a foot plate associated therewith, the form of foot being illustrated in Fig. 6 and heretofore described.

From the above detail description of the invention, it is believed that the construction and operation of the several forms thereof will at once be understood, it being noted that each foot portion of the strap tie down has a separate anchoring or foot plate associated therewith for reinforcing and strengthening the tie down foot and also for providing an increased anchoring area for each foot. The feet of the tie down are further strengthened by the manner of bending the strap portions of each foot of the tie down into engagement with the foot plate and as each foot plate is either permanently connected to or interlocked with the seat portions of the tie down disconnection or loss thereof is prevented.

While the preferred forms of the invention are herein illustrated, it is to be understood that various changes in the details of construction thereof as well as the substitution of other parts may be readily adopted without departing from the spirit and scope of the invention as hereinafter claimed.

What is claimed as new is:—

1. Anchoring means for motor vehicles comprising a tie down formed of a strip of material bent to provide anchoring feet, each having a base and a return bent portion, and a foot plate having a slot therein to receive the tie down foot with portions of the foot lying below and above the foot plate.

2. Anchoring means for motor vehicles comprising a tie down formed of a strip of material bent to provide anchoring feet, each having a base and a return bent portion, and a foot plate having a slot therein to receive the tie down foot with the base portion of the foot underlying the foot plate and with the return bent portion of the foot inclosing and overlying the outer end of the foot plate.

3. Anchoring means for motor vehicles comprising a tie down formed of a strip of material bent to provide anchoring feet, each having a base and a return bent portion, a foot plate having a slot therein to receive the tie down foot with portions of the foot lying below and above the foot plate, means for anchoring the foot plate in the tie down foot and said foot plate being constructed to accommodate the anchoring thereof to a car floor or other support.

4. Anchoring means for motor vehicles comprising a tie down formed of a strip of material bent to provide anchoring feet, each having a base and a return bent portion, a foot plate having a slot therein to receive the tie down foot with the base portion of the foot underlying the foot plate and with the return bent portion of the foot inclosing and overlying the outer end of the foot plate, means for anchoring the foot plate in the tie down foot and said foot plate being constructed to accommodate the anchoring thereof to a car floor or other support.

In testimony whereof I affix my signature.

EDWARD S. EVANS.